Aug. 30, 1960 R. J. O'BRIEN ET AL 2,950,590
APPARATUS FOR HOODING OPEN-FACED CONTAINERS
Filed Feb. 7, 1958 6 Sheets-Sheet 1

Inventors
Robert J. O'Brien
and Gordon A. Vold
By Mann, Brown and McWilliams, Attys.

United States Patent Office 2,950,590
Patented Aug. 30, 1960

2,950,590

APPARATUS FOR HOODING OPEN-FACED CONTAINERS

Robert J. O'Brien, Evanston, and Gordon A. Vold, Palatine, Ill., assignors to Ekco-Alcoa Containers Inc., a corporation of Illinois Filed Feb. 7, 1958, Ser. No. 713,971

20 Claims. (Cl. 53—342)

This invention relates to a hooding apparatus for applying a cover sheet of fragile, flexibly deformable material, such as metallic foil, across the open face of a container that may be of a semi-rigid type having a marginal stiffener lip or rim surrounding the open face thereof and, more particularly, the invention is concerned with providing an open-centered hooding frame that performs its hooding function automatically upon relative simultaneous movement therethrough of a container and cover sheet and for this purpose includes flexibly mounted cover-sheet engaging fingers bordering and defining the frame opening and undergoing swingable follower movement therethrouh while contacting the margin of the cover sheet for folding such margin around the rim and against the container to secure the cover sheet in tight engagement across the open face of the container.

Frozen foods and similar commodities are commonly marketed in containers in the form of disposable open-faced trays of an inexpensive, thin-walled, semi-rigid construction that are useful for subsequent storage, preparation, and serving. Such containers are formed of thin sheets of metallic foil, plastic, paperboard, or in various laminar arrangements and generally include a marginal stiffener lip or rim about their open face to provide them with the rigidity required for withstanding the handilng to which they are subjected. It is usual to enclose the containers by hooding a cover sheet across the open face thereof, and for this purpose, the margin of the cover sheet extends beyond the rim of the container for folding around and under the same and anchoring the sheet to the container in tight and, preferably, sealing engagement. Heretofore no satisfactory hooding apparatus for automatically folding and securing the cover sheet margins about the container rim in a one-step operation has been available, and there exists a genuine need for a practicable and reliable hooding device of this nature.

The principal object of the present invention is to provide a hooding apparatus that fills this need.

Another object is to provide an apparatus of this type in the form of a stationary, open-centered frame that is responsive to simultaneous unidirectional movement therethrough of an open-faced container and cover sheet therefor for folding and securing the margin of the sheet around the container rim.

Still another object of the invention is to provide an apparatus of the above type that includes a vertically reciprocable flatter that is engageable with the cover sheet and movable simultaneously therewith for holding the cover sheet across the container during movement thereof through the hooding device.

An additional object is to provide a hooding apparatus that includes a pre-wiping mechanism forwardly of the hooding fingers thereof for preliminarily bending over the margin of the cover sheet to enhance the action of the hooding fingers themselves.

Other objects and advantages will become apparent during the course of the following description.

In the accompanying drawings forming a part of this specification and in which like numerals are employed to designate like parts throughout the same.

Figure 1:
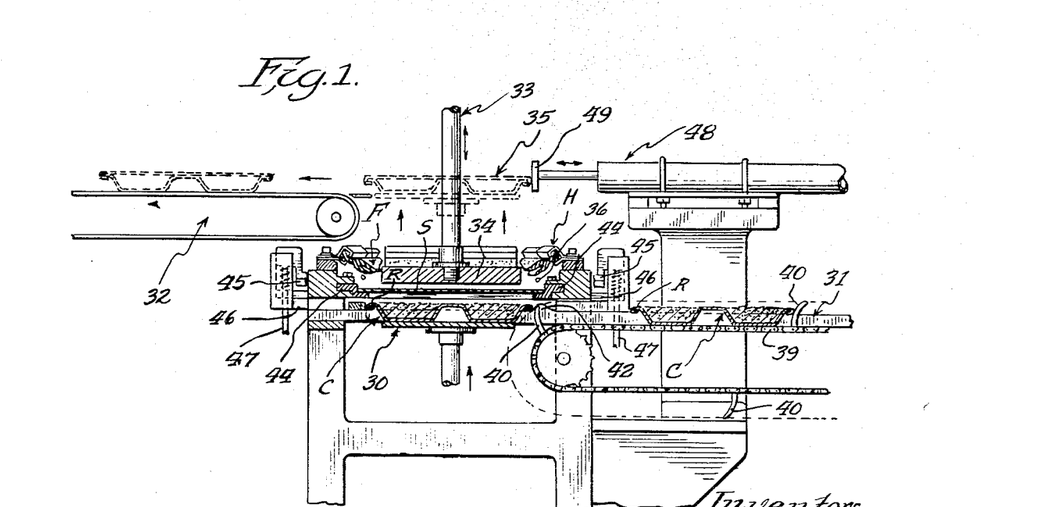
Fig. 1 is a diagrammatic side-elevational view, with parts broken away and sectioned, of a typical hooding machine that includes the hooding frame of the invention.
Figure 2:
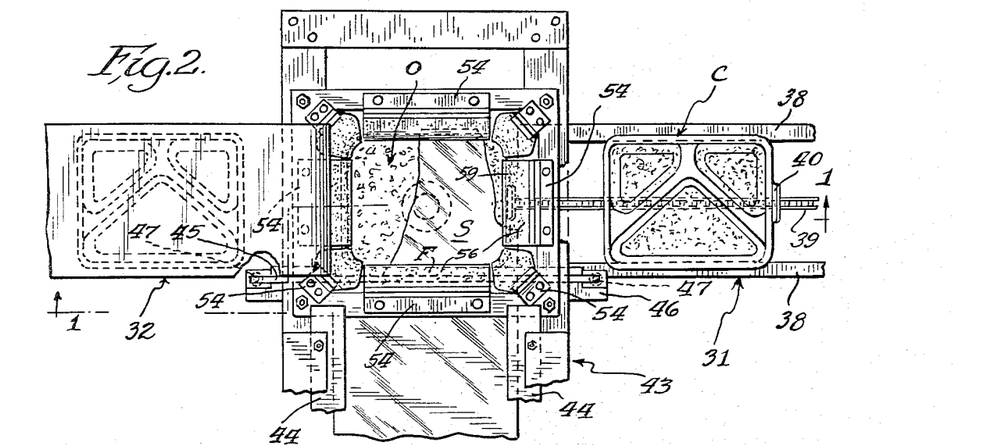
Fig. 2 is a plan view of the machine of Fig. 1, with parts thereof broken away and sectioned.

Referring now to Figs. 1 and 2, for purposes of disclosure the hooding frame H of the invention is shown embodied in a wrapping machine arrangement of a type that includes a periodically operable vertically reciprocable plate 30 for individually receiving containers C supplied along a feed conveyor 31 which delivers containers successively at predetermined intervals to a predetermined position above the plate. Individual cover sheets S are simultaneously provided across the vertical path of the containers at a point above the open face thereof and the plate elevates a container and overlying cover sheet to move the same simultaneously through the hooder H, which automatically folds and secures the margin of the cover sheet about the rim R of the container. The plate carries the hooded container above the frame for unloading onto a discharge conveyor 32.

For purposes of disclosure, the container C is illustrated as a semi-rigid, thin-walled, metallic foil type of compartmented tray having an open-topped face bordered by a marginal stiffener rim R, and the cover sheet S is illustrated as a metallic foil sheet that is characteristically fragile and flexibly deformable for reverse folding and securing thereof under the rim R. While the invention is applicable to containers of any shape, it is particularly advantageous in connection with irregularly shaped containers, and for purposes of disclosure, the container C of Figs. 1 and 2 is illustrated as a generally rectangular tray. It will be apparent that tray constructions of other than the metallic foil type may also be overwrapped by the hooding apparatus of the present invention. Similarly, the cover sheet may be plastic, a wax-coated paper or other similar flexible covering material and for securing it to the container may be provided with a heat or pressure-sensitive adhesive or a heat-shrinkable film along the folded marginal edge thereof that is to contact the container beneath its rim.

Alternatively, the container surface engaged by the sheet margin may carry the adhesive or the like.

Figure 4:
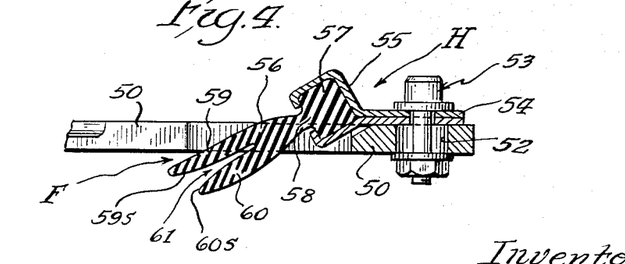
Fig. 4 is a fragmentary, detailed, sectional view taken through one of the legs of the frame of Fig. 3 as indicated by the line 4—4 thereon.

Referring specifically to Figs. 1 and 2 and generally to the sequential illustrations of Figs. 5–8, the hooding frame carries vertically flexible internal hooding fingers F, in the shape of a claw, that surround and define a central opening O through which the container and overlying cover sheet move. The fingers normally assume the generally downwardly and inwardly inclined position in which they are illustrated in Figs. 1 and 4 and are arranged to resiliently resist upward swinging movement thereof. The central opening defined by the fingers is complemental in shape and slightly smaller in size than the rim of the container; and as the container and cover sheet move upwardly through the frame opening, the fingers are engaged and undergo upward swinging followover movement for automatically folding and securing the margin of the sheet around the container rim.

As the fingers swing upwardly in following the container in its movement through the frame, they first wipe the overhanging margin of the cover sheet across the top and around the rim to provide a seal around the top of the container and, by virtue of their downwardly inclined initial position, gradually generate and apply an inwardly directed compressing or tucking pressure for securing and sealing the cover sheet beneath the rim. In the case of a metallic foil cover sheet, this folding and tucking action results in a dependable anchoring and effective securing of the cover sheet, even without the use of adhesive. When the container moves free, the fingers automatically return to their initial position for receiving and hooding the next container.

Thus, a simple, one-way movement of the container through the frame results in the automatic one-step folding and securing of the margin of the cover sheet about the rim of the container, and this permits of a simplified overall wrapping machine arrangement that performs an automated assembly-line type hooding operation without requiring prohibitively complex control devices for timing the starting and stopping of a sequence of individual wrapping motions.

A vertically reciprocable flatter mechanism 33 is preferably employed in conjunction with the frame of the invention for holding the cover sheet in proper relation across the open face of the container C. For this purpose, the flatter carries a plate 34 that is movable through the frame opening for engagement with the cover sheet prior to the hooding thereof by the frame. Thus, as the lower plate 30 moves the container C and cover sheet S through the frame, the flatter plate 34 rides thereon and ensures against lateral displacement of the cover sheet. In addition, the flatter plate smooths out any unevenness in the contents deposited in the container and thereby improves the external appearance of the packaged product.

It will be apparent that the flatter may either be controlled to move under its own power in unison with the container during the upward movement thereof by appropriate cam-type timing devices or it may actually ride on the container during the hooding phase of its upward travel. In either case, however, the flatter mechanism preferably moves to a position above and away from the uppermost position of the container, shown at 35 after wrapping thereof, in order to simplify transfer of the container to the discharge conveyor 32.

The invention also contemplates the provision of a pre-wiping frame 36 which, as illustrated, may be in the form of a stationary wire loop or other similar structure that defines a central opening complemental in shape and slightly larger in size than the container rim for initially engaging and preliminarily folding the overhanging margin of the cover sheet S. The pre-wipe wire 36 may be suspended by mounting brackets 36B suitably spaced about the hooding area. This preliminary folding action of the pre-wiping frame enhances the effectiveness of the hooding fingers F, as will be explained in greater detail hereinafter.

For purposes of disclosure the feed conveyor 31 is illustrated as consisting of a pair of laterally spaced rails 38 along which ride the opposite side edges of the container rim R and a drive chain 39 carrying a plurality of pusher bars 40 at spaced points therealong for delivering the containers at predetermined intervals.

In the present invention it is desirable that the containers move through the hooding frame in accurately positioned relation to the hooding fingers, and it thus is important that the container be positioned accurately upon the plate 30. In the illustrated arrangement the rails 38 are provided with suitably positioned end stops 41 and cooperating locating humps 42 for delivering the containers into an exact predetermined position above the plate. The plate may then move upwardly between the rails 38 to pick up the container and move it in an accurate vertical path. The container is moved to its plate-engaging position by bars 40; and for this purpose, the hump 42 is made small enough to allow the container to ride over it under the influence of the pusher bars and large enough to prevent backlash such as may occur upon the container's striking the end stop 41. An alternative arrangement is to provide a recessed nest for receiving a container in predetermined positional relationship.

The cover sheets S may be supplied from a continuous roll along a conveyor 43 (Fig. 1) that preferably includes a pair of tracks 44 provided with suitable guideways for the longitudinal edges of the sheet material. Suitable facilities may be provided for feeding the cover sheet material in predetermined lengths to a point overlying the open face of the container. Relatively vertically shiftable cooperating knife blades 45 and 46 operated by vertically reciprocable rods 47 are provided for severing the sheets to the desired length. The control of the supply of cover sheets is correlated with the other operations of the machine, as will be apparent to those skilled in this art.

Finally, the discharge conveyor 32 may be of the endless belt type, and transfer of the hooded containers thereto may be effected as illustrated by a suitably timed pusher-bar mechanism 48 having a horizontally reciprocable pusher head 49 that is actuatable during a dwell period provided in the timed movement of the elevator plate as it reaches its elevated dotted-line position of Fig. 1. Alternative arrangements for transferring the hooded container to the discharge conveyor are contemplated, such, for example, as the use of a mechanism for catching the container after elevation thereof on the plate and for transferring the container to the discharge conveyor after return of the elevator plate.

For brevity in disclosure, the detailed structures of the necessary handling-control devices have been omitted, as numerous conventional devices of this nature are presently known or available to persons skilled in the wrapping machine art.

*Specific description of hooding apparatus*

The hooding frame and, particularly, the construction and mounting arrangement of the hooding fingers F thereof is embodied in a variety of physical forms. One preferred arrangement for rectangular or other irregularly shaped containers is illustrated in Figs. 3 and 4 and comprises a rigid attachment frame 50, preferably of a one-piece metal or plastic construction and provided with corner holes 51 for anchor bolts (not shown) to the main frame of the machine and a plurality of pairs of inwardly extending parallel slots 52 for fastener assemblies 53 that anchor the fingers F.

In the case of sharp-cornered containers, it is preferred to provide independent finger assemblies along each of the container sides and corners as the different patterns of flexible swinging movement of each assembly are freely accommodated without peripheral distortion. One of the features contributing to the excellent hooding action of the present apparatus is the provision of peripherally or horizontally elongated hooding fingers; and in this respect, a continuous peripheral surface is desirable wherever it can be achieved without objectionably high corner resistance and distortion. This, of course, is dependent on the softness and elasticity of the finger material, the rigidity of the container and its rim, and the strength of the cover sheet.

Figure 3:
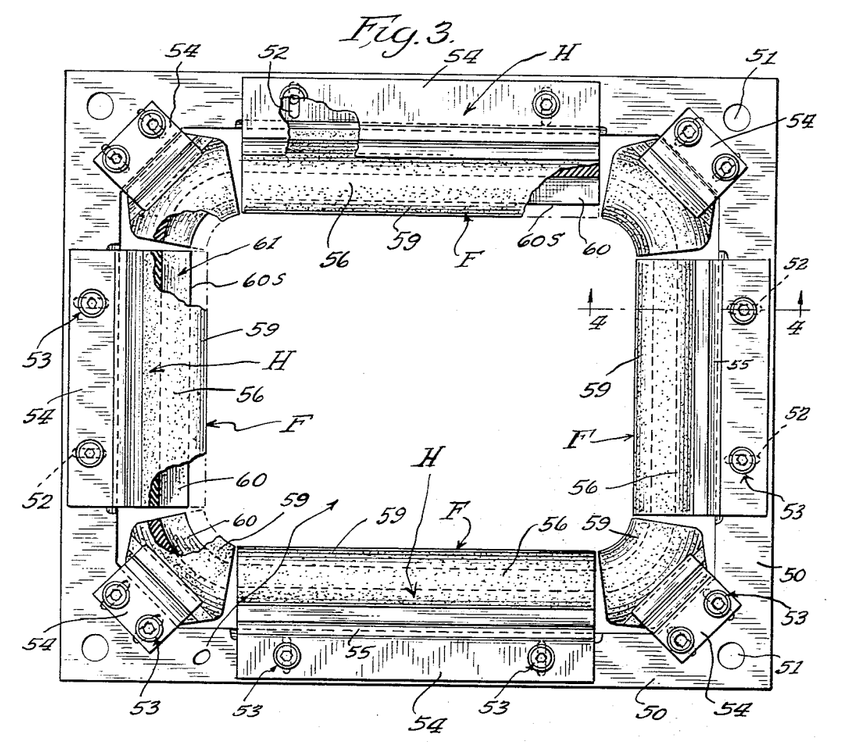
Fig. 3 is a detailed plan view of a preferred hooding frame of the present invention, with parts broken away and sectioned.

In the arrangement of Figs. 3 and 4, the finger assemblies each comprise a horizontally elongated, one-piece claw 56 of moldable or extrudable elastically distortable material, such as rubber, anchored in rigid gripping jaws 55 having base pads 54 secured by the fastener assemblies. The slots 52 accommodate inward adjustment of the claws to facilitate positioning thereof relative to the path of the container rim. Such adjustment also permits a single frame assembly to be adapted to a range of container sizes.

The gripping jaws 55 preferably define a horizontally elongated anchoring recess in the form of an undercut slot that receives an integral anchoring rib enlargement 57 formed on the claw complemental to the slot. The claw includes a wrist portion 58 that extends generally downwardly and inwardly through the mouth of the gripping jaws to merge and terminate in vertically flaring upper and lower fingers 59 and 60 that generally resemble, respectively, the index finger and thumb of a human hand. As indicated, the slot of the gripping jaws opens generally downwardly and inwardly to permit of utilizing a generally planar claw, thereby simplifying the manufacture thereof.

The fingers 59 and 60 are spaced apart vertically to form a generally inwardly extending, slot-shaped pocket 61 for receiving and engaging the rim of the container in a manner to be described. The pocket has a flared mouth to facilitate ingress and egress of the rim, and the pocket tapers inwardly to a rim-receiving region of less vertical dimension than the rim to develop a supplemental pinching action of the fingers against the rim.

In the embodiment of Figs. 3 and 4, the longer index finger 59 projects inwardly of the thumb 60 to present a generally downwardly facing wiping surface portion 59S spaced from the extremity thereof and projecting across the path of the container rim for folding and wiping the margin of the cover sheet across and around the top of the rim. The thumb 60 terminates immediately adjacent the path of the rim and provides a broad compressing surface 60S at the extremity thereof which gradually comes into play upon vertical swinging movement of the claw and presses or tucks the folded-over sheet margin inwardly against the container for completing the attachment and sealing of the cover sheet about the rim. The wrist 58 of the claw accommodates the desired resiliently flexible swinging follower movement and yieldingly accommodates outward displacement of the claw in response to its engagement with the container. It will be noted that as the claw swings upwardly, the opening defined thereby tends to contract, and the wrist and body of the claw are subjected to compressional loading and respond by swelling to accommodate a slight outward movement of the body and fingers of the claw.

Figures 5, 6, 7, 8:
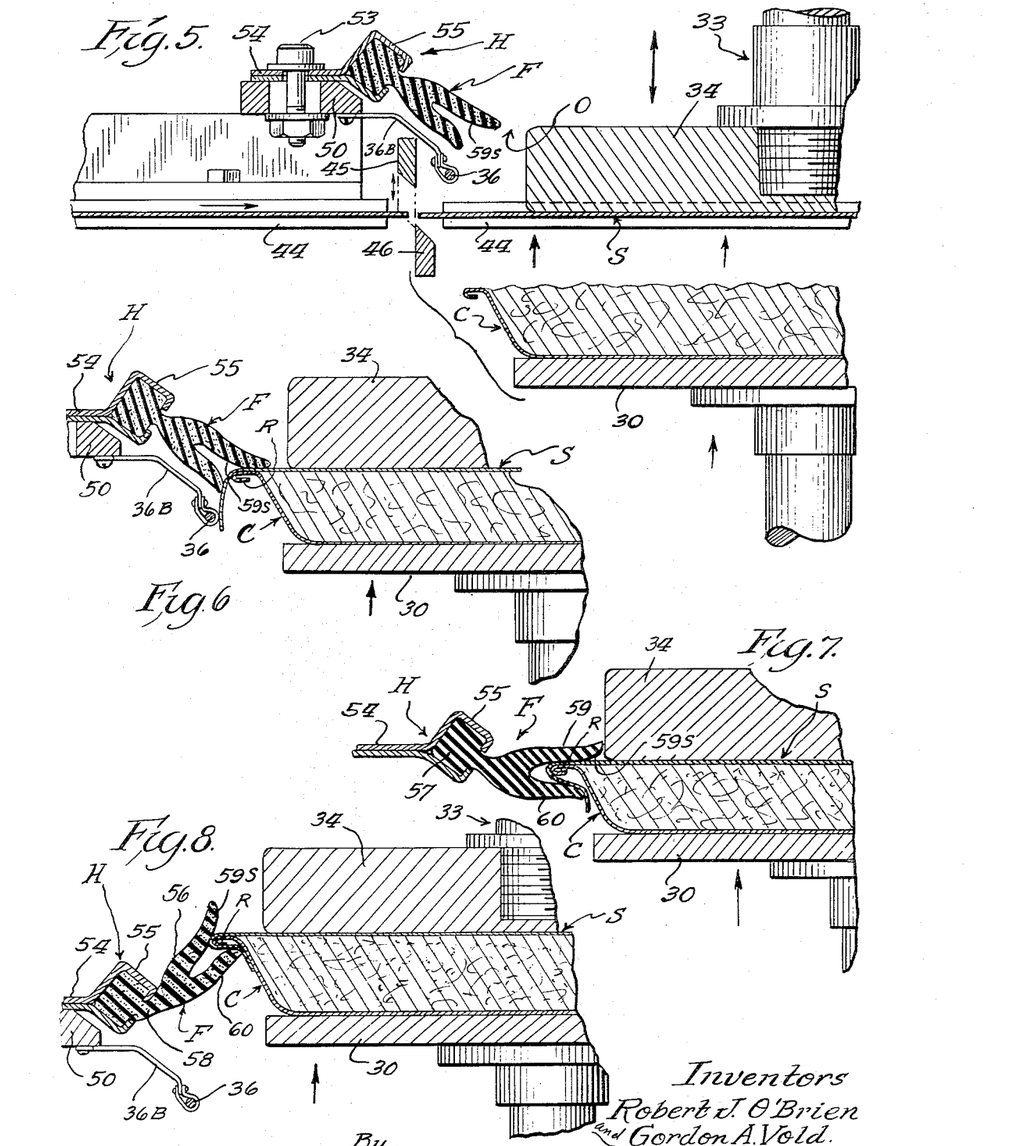
Figs. 5–8 are fragmentary, vertical, sectional views through the hooding apparatus illustrating successive stages in the operation thereof.

The operating sequence of the hooder is illustrated in detail in Figs. 5-8. In Fig. 5, the container is shown moving upwardly on the elevator plate into engagement with the cover sheet S, while the flatter plate 34 may have already reached its lowermost point of movement and be in adjacent overlying relation to the cover sheet S.

In Fig. 6 the nest has carried the container, cover sheet, and flatter plate past the pre-wipe wire, which has preliminarily folded down the margin of the cover sheet, and the wiping surface 59S of the index finger is shown engaging the cover sheet and wiping it tightly around the container rim. The preliminary folding by the pre-wipe wire 36 minimizes the possibility of the cover sheet's becoming fouled, particularly at the corners in the slits between adjacent claws. At this stage, the claw is just beginning its upward swinging movement and the tucking finger or thumb 60 has not yet come into play.

In Fig. 7, the claw has swung approximately midway through its upward movement and the container rim has fully entered the pocket 61 of the claw and spread the same slightly so that the fingers 56 and 60 are developing a vertical pinching action. The index finger 59 is still acting to wrap the cover sheet tightly around the upper portion of the rim, while the thumb 60 is now folding and tucking the extreme edge of the cover sheet underneath the rim of the container. At this stage the wrist of the claw is swollen in response to the outward compression delivered to the claw from the container, and this swelling of the wrist supplements the tucking action of the thumb 60.

Finally, in Fig. 8, the upward movement of the claw is approximately complete, and while the tucking action of the thumb is now lessening, the index finger is still wiping tightly around the rim and cooperating to assist the thumb in pinching the cover sheet to the rim. From this point the container will move free of the claw and the claw automatically returns to its initial position of Fig. 5.

Figures 9, 10:
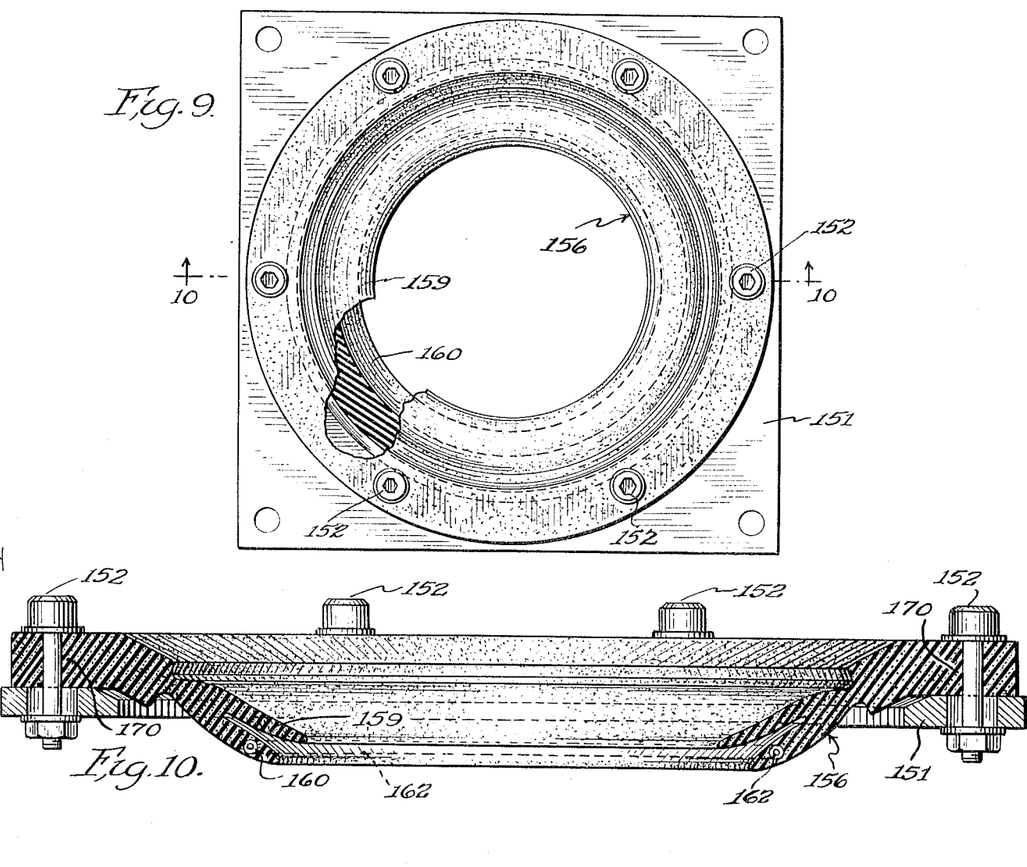
Fig. 9 is a detailed plan view, with parts broken away and sectioned, of a hooding frame useful with circular containers.
Fig. 10 is an enlarged sectional view taken on the line 10—10 of Fig. 9.

Figs. 9 and 10 illustrate a hooding frame construction that is arranged for hooding cover sheets on circular containers. The arrangement of Figs. 9 and 10 contemplates the use of a one-piece claw 156 having a molded anchor pad 170 integral therewith for directly mounting the claw to the main frame of the wrapping machine. As shown, the anchor pad 170 is secured to a rigid reinforcing frame 151 by suitable fasteners 152. The hooding fingers 159 and 160 are shown in the form of continuous loops, and while such a construction inherently offers greater resistance to upward swinging movement of the fingers, the invention contemplates the use of an appropriately softer rubber material to accommodate this inherently greater resistance. If desired, the construction of Figs. 9 and 10 could be modified by severing the fingers into discrete peripherally elongated sections to achieve substantially completely independent flexing movement of the fingers on opposite sides of the container opening.

As an added feature, the lower or thumb finger 160 is shown provided with a suitable electric resistance heater-coil element 162 embedded therein adjacent its inner extremity to adapt the hooder for use with cover sheets that are secured by means of heat-sensitive adhesive and heat-shrinkable films. Since the tucking action of the thumb underneath the rim is primarily depended upon for anchoring of the cover sheet, it is preferred to mount the heater coil in it, though, if desired, a similar arrangement could be provided in the wiping finger 159.

Figures 11, 12, 13, 14, 15:
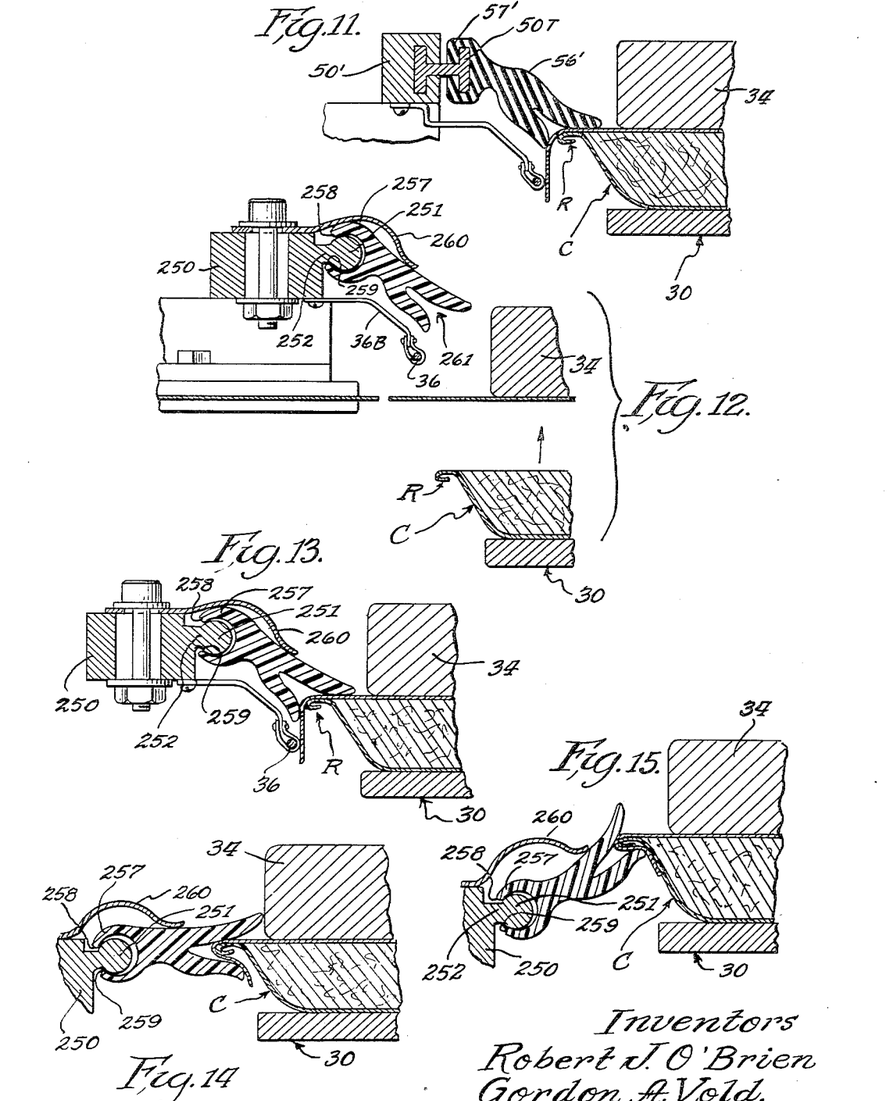
Fig. 11 is a detailed sectional view through one leg of a hooding frame illustrating an alternative mounting arrangement for the hooding fingers thereof.
Figs. 12–15 are fragmentary, vertical, sectional views through an alternative form of hooding apparatus illustrating the successive stages in the operation thereof.

Fig. 11 illustrates an alternative arrangement for mounting a one-piece claw of resilient material wherein a rigid attachment frame 50', of metal or plastic, carries a rigid, T-shaped projection 50T of metal or plastic on which is telescoped a slotted anchor portion 57' carrying an integral claw 56', which is otherwise similar in construction and operation to that of Fig. 4.

In Figs. 12-15 an alternative hooding apparatus is illustrated wherein a rigid attachment frame 250, which may be of one-piece metal or plastic construction, includes an inwardly extending projection in the shape of a horizontal cylinder 251 and intermediate connection neck 252 on which a claw 256 of rigid, molded plastic material is telescoped, with the claw including an enlarged anchor portion 257 formed with a cylindrically shaped horizontal socket that opens through a mouth bordered by confronting stop lips 258 and 259 that cooperate in limiting the upper and lower extremities of swinging movement of the claw. A suitably contoured leaf spring 260 is shown anchored to the attachment frame and resiliently pressing downwardly on the body of the claw, with the lower stop lip 259 abutting the connection neck 252 to fix the initial downwardly and inwardly inclined position of the claw.

In Fig. 13 the claw is shown initially engaging the cover sheet, which has already been folded downwardly by the pre-wiping frame 36, and the index finger of the claw, under the influence of the leaf spring, is exerting a wiping action across the top of the container rim.

In Fig. 14 the claw has moved approximately to its midway position and the container rim is fully within the claw pocket. It will be noted that in this rigid claw construction, the pocket 261 is of a generally flaring nature through its length and as the container rim enters the pocket, the claw develops a wedge-like pinching action by virtue of the pocket configuration. At the halfway point of movement of Fig. 14, this wedging is actively pressing the cover sheet against the rim of the container. It will be remembered that the frame opening tends to contract as the fingers swing upwardly, and the cylinder and socket pivot connection preferably provides sufficient slack or clearance to accommodate outward displacement of the claw as it moves through its center position.

In Fig. 15 the claw has substantially completed its upward swinging movement and the thumb has actively tucked the sheet margin underneath the rim in response to the generally inwardly directed loading that is applied to the claw by the leaf spring 260 during this phase of the claw movement. From this point, the container moves free of the claw, and the upper stop lip 258 must accommodate sufficient upward swinging of the claw to permit the container to escape without distortion of its rim.

Figures 16, 17, 18:
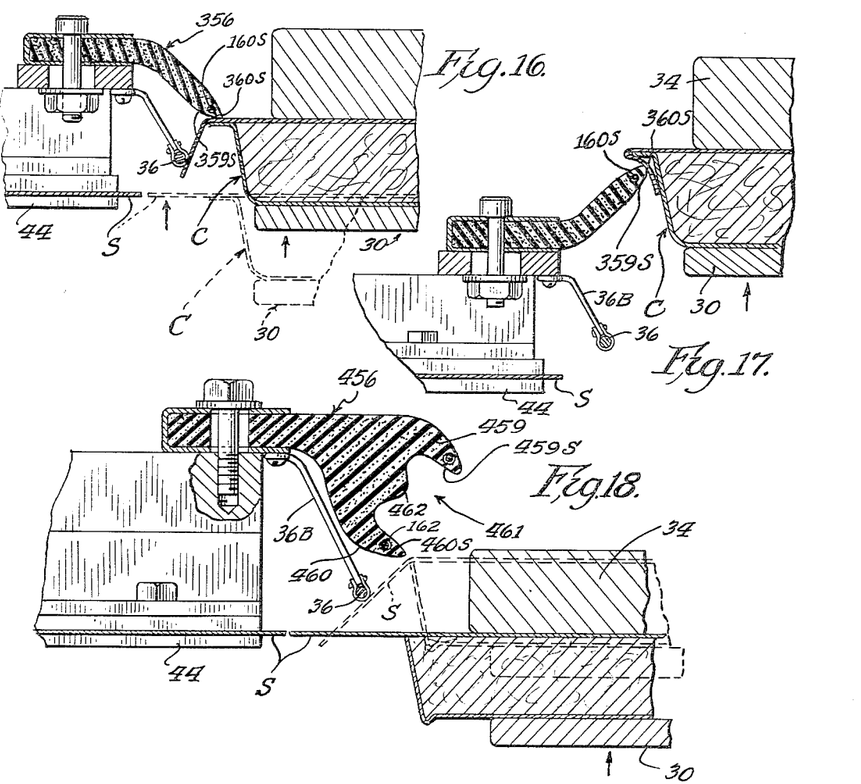
Figs. 16 and 17 are fragmentary, vertical sectional views of still another alternative arrangement.
Figs. 18 and 19 are fragmentary, vertical, sectional views of a modified hooding-finger construction useful with a deep-rim container or box to be overwrapped.

Figs. 16 and 17 illustrate a simplified finger construction for hooding cover sheets onto open-faced containers wherein the claw 356 is again of a one-piece molded construction of elastically distortable material, such as rubber, and presents horizontally elongated hooding surfaces 359S and 360S, respectively, for wiping and pressing the cover sheet across the container rim and against the side wall of the container. According to this arrangement, the wiping surface 359S is on the underneath face of the claw finger spaced slightly from the extremity thereof, and it initially engages the cover sheet over the top of the rim and, in swinging upwardly with the movement of the container, it wraps the cover sheet tightly across the rim to develop a seal around the top of the container. As the container continues upwardly, however, the finger deflects reversely and ultimately springs inward past the rim to sweep along the cover sheet towards the extremity thereof. At this stage the compression surface 360 at the extremity of the finger presses and wipes the cover sheet against the container wall (see Fig. 17). The single-fingered hooding claw secures and seals the cover sheet both around the top edge of the rim and around the container side walls, and it finds important use in the many applications wherein it is not vital that the cover sheet be shaped to the contour of the rim by a positive tucking action.

The integral mounting pad of the single-fingered claw is shown extending horizontally into the mouth of a U-shaped gripping jaw, though, if desired, this pad may be arranged and secured after the manner illustrated in Fig. 4.

In circumstances where this single-finger hooding arrangement is to be used with a cover having a heat-sensitive sealant embodied thereon or where the side wall of the container carries a heat-sensitive sealant, a heating coil 160S may be provided within the finger and adjacent the tip thereof to provide a source of heat for effectuating a seal between the cover and the container as the container moves through the hooding apparatus.

Figure 19:
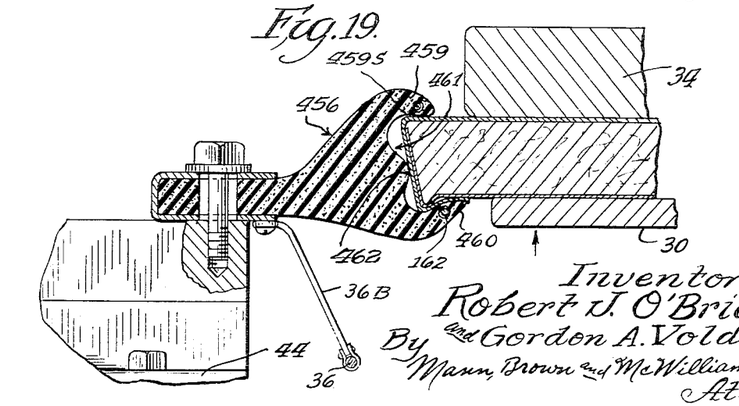

In Figs. 18 and 19 is illustrated a modified claw 456 for use with containers or boxes wherein the side wall constitutes the rim and is of appreciable depth. In this instance, the cooperating hooding fingers 459 and 460 are spaced apart appreciably to provide a wide-mouthed pocket 461 slightly shorter than the rim wall. The claw is shown as being of rubber or similar material. The functioning is essentially the same as the previously described rubber claws of Figs. 4 and 10 in that the claw develops a pinching action that supplements the action of the wiping surface 459S on the top finger and the pressing or tucking action of the surface 460S at the extremity of the bottom finger. However, in this instance, the base of the pocket is formed with a central ridge or knuckle 462 for reaction against the container wall medially along the height thereof. This ridge is important for maintaining the transverse positioning of the container as it moves through the hooding frame and is subjected to the action of the claw. The ridge also holds the cover material in position against the side walls of the container to prevent buckling of the portion of the cover sheet overlying these side walls.

We claim:

1. In a hooding machine for applying a cover sheet to a container having a marginal rim bordering an open face thereof, the combination with a container feed conveyor, elevating means including a plate for receiving a container from the conveyor for elevating said plate and container through a predetermined vertical path, means for supplying cover sheets above and extending beyond the rim of said container, and means above said feed conveyor for removing a hooded container from said elevating means after elevation thereof, of a hooding frame having a central opening through which said plate reciprocates to move a container and overlying cover sheet upwardly therethrough for hooding the container and presenting the same to said removing means, said frame having vertically swingable confronting internal hooding fingers anchored thereto and bordering and defining said opening with said opening being complemental to and slightly smaller than the container rim, said fingers having generally downwardly facing broad hooding surfaces thereon resiliently biased to a point beneath the center of swinging movement thereof to engage and hood said cover sheet over said container in response to movement of said container upwardly through said opening.

2. A hooding machine comprising a feed conveyor for containers to be overwrapped, said containers having an open face bordered by a marginal rim, elevating means including a plate for receiving the containers individually from the feed conveyor and means for vertically reciprocating said plate and moving a container thereon through a predetermined vertical path, means for supplying cover sheets across the open face of said container, said cover sheets having margins extending beyond said rim for folding thereabout, a hooding frame having internal confronting hooding fingers anchored thereto and bordering and defining a central opening through which said plate reciprocates vertically, said opening being complemental to and slightly smaller than the container rim, said fingers having broad hooding surfaces thereon resiliently biased to a point that is spaced from the center of swinging movement thereof in the vertical direction towards the place at which the plate receives containers, with said hooding surfaces facing generally towards said place to engage and hood said cover sheet over said container in response to movement of said container upwardly through said opening, and means for removing a hooded container from said plate after one-way movement thereof through said opening.

3. A hooding frame for overwrapping the open face of a container with a cover sheet, said container having a marginal rim bordering said face and said sheet having the margin thereof extending beyond said rim for reverse folding therearound, said frame having internal confronting hooding fingers bordering and defining a central opening through which passes said container and overlying cover sheet upon relative movement thereof with respect to said frame, said frame having extending means anchored thereto and flexibly carrying said fingers for accommodating swinging motion thereof in the direction of said relative movement upon reaction against said container during such movement, said fingers having broad hooding surfaces thereon resiliently biased to a point that is spaced from the center of swinging movement thereof towards the place from which the container enters said opening with said hooding surfaces facing said place.

4. A hooding frame for overwrapping a cover sheet across the open face of a container, said container having a marginal rim bordering said face with the margin of said sheet overhanging said rim for reverse folding therearound, said frame having internal confronting hooding fingers bordering and defining a central opening through which said container and cover sheet pass upon upward movement thereof through said frame, said frame having extending means anchored thereto and flexibly carrying said fingers for accommodating upward swinging movement thereof in response to reaction against said container during upward movement thereof through said opening, said fingers having broad wiping surfaces spaced from the free ends thereof and broad compression surfaces at the free ends thereof and being resiliently biased to a point that is spaced downwardly from the center of swinging movement thereof to dispose said wiping surfaces to extend crosswise of the path of said rim and facing in a generally downward direction.

5. Hooding apparatus for overwrapping a cover sheet across the open face of a container, said container having a marginal rim bordering said face, with the margin of said sheet overhanging said rim for reverse folding therearound, said apparatus comprising a frame having internal confronting hooding fingers bordering and defining a central opening through which said container and cover sheet pass upon upward movement thereof through said frame, said frame having extending means anchored thereto and flexibly carrying said fingers for accommodating upward swinging movement thereof in response to reaction against said container during upward movement thereof through said opening, said fingers having broad wiping surfaces spaced from the free ends thereof and broad compression surfaces at the free ends thereof and being resiliently biased to a point that is spaced downwardly from the center of swinging movement thereof to dispose said wiping surfaces to extend crosswise of the path of said rim and facing in a generally downward direction, and a prewiping frame having a stationary wiping loop disposed immediately beneath the lower extremity of said fingers and defining a central opening complemental to and slightly larger than the container rim for preliminarily folding the overhanging margin of the cover sheet in response to upward movement of said container and cover sheet through said prewiping frame.

6. In a hooding machine for applying a cover sheet to a container having a marginal rim bordering an open face thereof, said sheet having the margin thereof extended beyond said rim for folding and securing thereunder, the combination with a container feed conveyor, elevating means including a plate for receiving a container from the conveyor and means for elevating said plate to move the container thereon through a predetermined vertical path, means for supplying a cover sheet across the open face of said container at a point at the lower end of the vertical path thereof, and means for removing a hooded container from said plate after elevation thereof; of hooding apparatus positioned intermediately along said path at a point above said first-mentioned point and comprising a hooding frame having a central opening through which said plate reciprocates, said frame having vertically swingable confronting internal hooding fingers anchored thereto and bordering and defining said opening, with said opening being complemental to and slightly smaller than the container rim, said fingers having generally downwardly facing broad hooding surfaces thereon resiliently biased downwardly of the center of swinging movement thereof to engage and hood said cover sheet over said container in response to movement of said container upwardly through said opening, and a flatter above said plate and vertically reciprocable through said opening to engage and hold the cover sheet across the top of said container during movement thereof through said opening.

7. In a hooding machine for applying a cover sheet to a container having a marginal rim bordering an open face thereof, said sheet having the margin thereof extended beyond said rim for folding and securing thereunder, the combination with a container feed conveyor, elevating means including a plate for receiving a container from the conveyor and means for elevating said plate to move the container thereon through a predetermined vertical path, means for supplying a cover sheet across the open face of said container at a point at the lower end of the vertical path thereof, and means for removing a hooded container from said plate after elevation thereof; of hooding apparatus positioned intermediately along said path at a point above said first-mentioned point and comprising a hooding frame having a central opening through which said plate reciprocates, said frame having vertically swingable confronting internal hooding fingers anchored thereto and bordering and defining said opening, with said opening being complemental to and slightly smaller than the container rim, said fingers having generally downwardly facing broad hooding surfaces thereon resiliently biased downwardly of the center of swinging movement thereof to engage and hood said cover sheet over said container in response to movement of said container upwardly through said opening, and a prewiping frame having a stationary wiping loop disposed immediately beneath the lower extremity of said hooding surfaces and defining a central opening complemental to and slightly larger than the container rim for engaging and preliminarily folding the overhanging margin of the cover sheet.

8. In a hooding machine for applying a cover sheet to a container having a marginal rim bordering an open face thereof, said sheet having the margin thereof extended beyond said rim for folding and securing thereunder, the combination with a container feed conveyor, elevating means including a plate for receiving a container from the conveyor and means for elevating said plate to move the container thereon through a predetermined vertical path, means for supplying a cover sheet across the open face of said container at a point at the lower end of the vertical path thereof, and means for removing a hooded container from said plate after elevation thereof; of hooding apparatus positioned intermediately along said path at a point above said first-mentioned point and comprising a hooding frame having a central opening through which said plate reciprocates, said frame having vertically swingable confronting internal hooding fingers anchored thereto and bordering and defining said opening, with said opening being complemental to and slightly smaller than the container rim, said fingers having generally downwardly facing broad hooding surfaces thereon resiliently biased downwardly of the center of swinging movement thereof, a pre-wiping frame having a stationary wiping loop disposed immediately beneath the lower extremity of said hooding surfaces and defining a central opening complemental to and slightly larger than the container rim for engaging and preliminary folding the overhanging margin of the cover sheet to engage and hood said cover sheet over said container in response to movement of said container upwardly through said opening, and a flatter above said plate and vertically reciprocable successively through both said openings to ride on and hold the cover sheet across the top of said container during movement thereof through said openings.

9. A hooding frame for overwrapping a cover sheet across the open face of a container, said container having a marginal rim bordering said face with the margin of said sheet overhanging said rim for reverse folding therearound, said frame having common extending means anchored thereto and supporting vertically divided distinctive upper and lower sets of internal confronting hooding fingers that define a container rim-receiving pocket bordering and defining a central opening through which said container and cover sheet pass upon upward movement thereof through said frame, said extending means flexibly carrying said fingers for accommodating upward swinging movement thereof in response to reaction against said container during upward movement thereof through said opening, the fingers of said upper set having broad wiping surfaces along the underneath side thereof and projecting inwardly of the fingers of said lower set, with the free ends of the fingers of said lower set constituting compression surfaces, said extending means being biased to a point that is spaced downwardly of the center of swinging movement thereof to dispose said wiping surfaces crosswise of the path of said rim.

10. A hooding frame for overwrapping a cover sheet across the open face of a container, said container having a marginal rim bordering said face with the margin of said sheet overhanging said rim for reverse folding therearound, said frame having internal confronting hooding fingers bordering and defining a central opening through which said container and cover sheet pass upon upward movement thereof through said frame, said frame having extending means anchored thereto, said extending means being of elastically distortable material that is flexible for vertical swinging movement and that carries said fingers for accommodating upward swinging movement thereof in response to reaction against said container during upward movement thereof through said opening, said fingers having downwardly facing broad wiping surfaces and inwardly facing broad compression surfaces and said extending means being downwardly and inwardly inclined to normally dispose said wiping surfaces crosswise of the path of said rim at a point spaced downwardly from the center of swinging movement thereof.

11. A hooding frame for overwrapping a cover sheet across the open face of a container, said container having a marginal rim bordering said face with the margin of said sheet overhanging said rim for reverse folding therearound, said frame having common extending means anchored thereto, said extending means being of elastically distortable material and terminating in vertically flaring distinctive upper and lower sets of internal confronting hooding fingers that define a container rim-receiving pocket bordering and defining a central opening through which said container and cover sheet pass upon upward movement thereof through said frame, said extending means flexibly carrying said fingers for accommodating upward swinging movement thereof in response to reaction against said container during upward movement thereof through said opening, the fingers of said upper set having broad wiping surfaces along the underneath side thereof and projecting inwardly of the fingers of said lower set, with the free ends of the fingers of said lower set constituting compression surfaces, said extending means being downwardly and inwardly inclined to normally dispose said wiping surfaces crosswise of the path of said rim at a point spaced downwardly from the center of swinging movement thereof.

12. A hooding frame for overwrapping a cover sheet across the open face of a contaner, said container having a marginal rim bordering said face with the margin of said sheet overhanging said rim for reverse folding therearound, said frame having a rigid anchor frame, a plurality of horizontally elongated extending members secured at one end thereof to said anchor frame in closely spaced relation about the inner periphery thereof, said extending members being of elastically distortable material and terminating at the other end thereof in vertically flaring distinctive upper and lower sets of internal confronting hooding fingers that define a container rim-receiving pocket bordering and defining a central opening through which said container and cover sheet pass upon upward movement thereof through said fingers, said extending members flexibly carrying said fingers for accommodating upward swinging movement thereof in response to reaction against said container during upward movement thereof through said opening, the fingers of said upper set having broad wiping surfaces along the underneath side thereof and projecting inwardly of the fingers of said lower set, with the free ends of the fingers of said lower set constituting compression surfaces, said extending members being downwardly and inwardly inclined to normally dispose said wiping surfaces crosswise of the path of said rim at a point spaced downwardly from the center of swinging movement thereof.

13. In a hooding machine for applying a cover sheet to a container having a marginal rim bordering an open face thereof, the combination with a container feed conveyor, elevating means including a plate for receiving a container from the conveyor for elevating said plate and container through a predetermined vertical path, means for supplying cover sheets above and extending beyond the rim of said container, and means above said feed conveyor for removing a hooded container from said elevating means after elevation thereof, of a hooding frame having a central opening through which said plate reciprocates to move a container and overlying cover sheet upwardly therethrough for hooding the container and presenting the same to said removing means, said frame having a plurality of flexibly resilient fingers anchored thereto and extending therefrom into confronting internal relation to border and define said opening, with said opening being complemental to and slightly smaller than the container rim, said fingers normally extending generally downwardly and inwardly across the path of said rim to react against said rim and undergo vertical swinging follower movement in response to relative movement of said container and overlying cover sheet upwardly through said opening for hooding said cover sheet over said container.

14. In a hooding machine for applying a cover sheet to a container having a marginal rim bordering an open face thereof, the combination with a container feed conveyor, elevating means including a plate for receiving a container from the conveyor for elevating said plate and container through a predetermined vertical path, means for supplying cover sheets above and extending beyond the rim of said container, and means above said feed conveyor for removing a hooded container from said elevating means after elevation thereof, of a hooding frame having a central opening through which said plate reciprocates to move a container and overlying cover sheet upwardly therethrough for hooding the container and presenting the same to said removing means, said frame having a plurality of one-piece claws of elastically distortable material anchored thereto, said claws each having a wrist portion extending generally downwardly and inwardly from said frame and terminating in integrally connected upper and lower fingers that border and define said opening, with the upper fingers projecting inwardly of the lower fingers to cross the path of the container rim, said upper and lower fingers forming a slot-shaped pocket having a flaring mouth opening inwardly of the frame for receiving the container rim as said container moves through said opening to cause said upper fingers to react against the rim and swing said claws vertically upwardly in response to movement of said container and overlying cover sheet upwardly through said opening, with the upper fingers wiping the edges of the cover sheet around the container rim and the lower fingers thereafter tucking said edges tightly against the container.

15. A hooding frame for overwrapping the open face of a container with a cover sheet, said container having a marginal rim bordering said face and said sheet having the margin thereof extending beyond said rim for reverse folding therearound, said frame having a plurality of flexibly resilient fingers anchored thereto and extending therefrom into confronting internal relation to border and define a central opening that is complemental to and slightly smaller than the container rim, with the container and overlying cover sheet being movable upwardly through this opening, said fingers normally extending generally downwardly and inwardly across the path of movement of the rim to react against the rim and initially undergo convergent upward swinging follower movement and thereafter divergent upward swinging follower movement in response to movement of each container and overlying cover sheet upwardly through the opening for hooding the cover sheet over the container.

16. A hooding frame for overwrapping the open face of a container with a cover sheet, said container having a marginal rim bordering said face and said sheet having the margin thereof extending beyond said rim for reverse folding therearound, said frame having a plurality of one-piece claws of elastically distortable material anchored thereto, said claws each having a wrist portion extending generally downwardly and inwardly from said frame and terminating in integrally connected upper and lower fingers that border and define a central opening through which pass the container and overlying cover sheet, with the upper fingers projecting inwardly of the lower fingers to cross the path of the container rim, said upper and lower fingers forming a slot-shaped pocket having a flaring mouth opening inwardly of the frame for receiving the container rim as said container moves upwardly through said opening to cause said upper fingers to react against the rim and swing said claws vertically upwardly in response to movement of said container and overlying cover sheet upwardly through said opening, with the upper fingers wiping the margin of the cover sheet around the container rim and the lower fingers thereafter tucking said margin tightly against the container.

17. A hooding machine comprising a feed conveyor for containers to be overwrapped, said containers having an open face bordered by a marginal rim, elevating means including a plate for receiving the containers individually from said conveyor and means for vertically reciprocating said plate to move a container thereon through a predetermined vertical path, means for applying cover sheets across the open face of said container, said cover sheets having margins extending beyond said rim for folding thereabout, a hooding frame having internal confronting hooding fingers anchored thereto for resilient vertical swinging movement, said fingers bordering and defining a central opening through which said plate reciprocates, said opening being complemental to and slightly smaller than the container rim, said fingers extending obliquely downwardly from the frame to a normal position that is spaced from the center of swinging movement thereof and having broad wiping surfaces facing generally downwardly and intersecting the path of the container rim such that said fingers engage said cover sheet and container to initially undergo convergent upward swinging follower movement and thereafter divergent upward swinging follower movement, and means for removing a hooded container from said plate after one-way movement thereof through said opening.

18. A hooding frame for overwrapping a cover sheet across the open face of a container, said container having a marginal rim bordering its open face, with the margin of said sheet overhanging said rim for reverse folding therearound, said frame having internal confronting hooding fingers anchored thereto for resilient vertical swinging movement, said fingers bordering and defining a central opening through which said container and cover sheet move upwardly through the frame, said opening being complemental to and slightly smaller than the container rim, said fingers extending obliquely downwardly from the frame to a normal position that is spaced from the center of swinging movement thereof and having broad wiping surfaces facing generally downwardly and intersecting the path of the container rim such that said fingers engage said cover sheet and container to initially undergo convergent upward swinging follower movement and thereafter divergent upward swinging follower movement.

19. In a hooding machine for applying a cover sheet to a container having a marginal rim bordering an open face thereof, the combination with a container feed conveyor, elevating means including a plate for receiving a container from the conveyor for elevating said plate and container through a predetermined vertical path, means for supplying cover sheets above and extending beyond the rim of said container, and means above said feed conveyor for removing a hooded container from said elevating means after elevation thereof, of a hooding frame having a central opening through which said plate reciprocates to move a container and overlying cover sheet upwardly therethrough for hooding the container and presenting the same to said removing means, said frame having a plurality of one-piece claws of elastically distortable material anchored thereto, said claws each having a wrist portion extending generally downwardly and inwardly from said frame and terminating in integrally connected upper and lower fingers that border and define said opening, with the upper fingers projecting inwardly of the lower fingers to cross the path of the container rim, said upper and lower fingers forming a slot-shaped pocket having a flaring mouth opening inwardly of the frame for receiving the container rim as said container moves through said opening to cause said upper fingers to react against the rim and swing said claws vertically upwardly in response to movement of said container and overlying cover sheet upwardly through said opening, with the upper fingers wiping the edges of the cover sheet around the container rim and the lower fingers thereafter tucking said edges tightly against the container, and a pre-wiping frame having a stationary wiping loop disposed immediately beneath the lower extremity of said lower fingers and defining a central opening complemental to and slightly larger than the container rim for engaging and preliminarily folding the edge of the cover sheet downwardly over the container rim.

20. In a hooding machine for applying a cover sheet to a container having a marginal rim bordering an open face thereof, the combination with a container feed conveyor, elevating means including a plate for receiving a container from the conveyor for elevating said plate and container through a predetermined vertical path, means for supplying cover sheets above and extending beyond the rim of said container, and means above said feed conveyor for removing a hooded container from said elevating means after elevation thereof, of a hooding frame having a central opening through which said plate reciprocates to move a container and overlying cover sheet upwardly therethrough for hooding the container and presenting the same to said removing means, said frame having a plurality of one-piece claws of elastically distortable material anchored thereto, said claws each having a wrist portion extending generally downwardly and inwardly from said frame and terminating in integrally connected upper and lower fingers that border and define said opening, with the upper fingers projecting inwardly of the lower fingers to cross the path of the container rim, said upper and lower fingers forming a slot-shaped pocket having a flaring mouth opening inwardly of the frame for receiving the container rim as said container moves through said opening to cause said upper fingers to react against the rim and swing said claws vertically upwardly in response to movement of said container and overlying cover sheet upwardly through said opening, with the upper fingers wiping the edges of the cover sheet around the container rim and the lower fingers thereafter tucking said edges tightly against the container, a pre-wiping frame having a stationary wiping loop disposed immediately beneath the lower extremity of said lower fingers and defining a central opening complemental to and slightly larger than the container rim for engaging and preliminarily folding the edge of the cover sheet downwardly over the container rim, and a flatter above said plate and vertically reciprocable successively through both said openings to ride on and hold the cover sheet across the top of said container during movement thereof through said openings.

References Cited in the file of this patent

UNITED STATES PATENTS

| | | |
|---|---|---|
| 1,160,369 | Bradley | Nov. 16, 1915 |
| 1,266,914 | Braecklein | May 21, 1918 |
| 1,955,331 | Howard et al. | Apr. 17, 1934 |
| 1,978,630 | Hesson | Oct. 30, 1934 |
| 2,008,802 | Stanek et al. | July 23, 1935 |
| 2,170,760 | Lyon | Aug. 22, 1939 |
| 2,394,936 | Palmer | Feb. 12, 1946 |
| 2,486,252 | Briggs | Oct. 25, 1949 |
| 2,738,089 | Wenzel | Mar. 13, 1956 |
| 2,767,537 | Prince et al. | Oct. 23, 1956 |